(12) United States Patent
Ji et al.

(10) Patent No.: US 7,433,107 B2
(45) Date of Patent: Oct. 7, 2008

(54) RASTER SCANNING DISPLAY SYSTEM (75) Inventors: Chang-Hyeon Ji, Seoul (KR);
Young-Joo Yee, Gyeonggi-do (KR);
See-Hyung Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 199 days.

(21) Appl. No.: 11/205,860

(22) Filed: Aug. 18, 2005

(65) Prior Publication Data

US 2006/0039059 A1  Feb. 23, 2006

(30) Foreign Application Priority Data

Aug. 18, 2004  (KR) .................. 10-2004-0065151

(51) Int. Cl.
*G02B 26/08* (2006.01)

(52) U.S. Cl. ........................................... 359/202

(58) Field of Classification Search ............... 359/212, 359/213, 224, 201, 202, 214, 126, 290, 291
See application file for complete search history.

(56) References Cited

U.S. PATENT DOCUMENTS

| | | | |
|---|---|---|---|
| 3,919,527 A * | 11/1975 | Bowen et al. | 359/214 |
| 6,800,844 B2 * | 10/2004 | Kandori et al. | 250/234 |
| 2003/0015652 A1 | 1/2003 | Kandori | |
| 2003/0210444 A1 | 11/2003 | Lee | |
| 2004/0263937 A1 * | 12/2004 | Fujii et al. | 359/212 |

* cited by examiner

*Primary Examiner*—Euncha P Cherry
(74) *Attorney, Agent, or Firm*—Lee, Hong, Degerman, Kang & Schmadeka (57) ABSTRACT

Disclosed herein is a raster scanning display system. The raster scanning display system includes a micro mirror and a galvanic mirror. The micro mirror rotates in two horizontal directions and forms a horizontal beam by reflecting input light. The galvanic mirror rotates in two vertical directions and forms a two-dimensional scan region by reflecting the horizontal beam.

20 Claims, 7 Drawing Sheets

RASTER SCANNING DISPLAY SYSTEM

CROSS REFERENCE TO RELATED APPLICATIONS

Pursuant to 35 U.S.C. § 119(a), this application claims the benefit of earlier filing date and right of priority to Korean Patent Application No. 10-2004-065151, filed on Aug. 18, 2004, the content of which is hereby incorporated by reference herein in its entirety

BACKGROUND OF THE INVENTION

1. Field of the Invention

The present invention relates to a projection type scanning image display system, which operates mirrors for reflecting input light and, thus, modulates the path of the reflected light in a space, thus forming an image.

2. Description of the Related Art

A raster scanning display system provides a means for scanning a beam, which is emitted from a light source, onto a predetermined one-dimensional (linear) or two-dimensional (planar) region, thus representing information, such as an image. Furthermore, the raster scanning display system integrated with optical sensors, such as photodiodes or photodetectors, can be applied to scanners that scan and read information formed on a one-dimensional or two-dimensional region.

A scanning micro mirror according to the present invention can be applied to laser printers, confocal microscopes, barcode scanners, scanning displays, various sensors and the like, which scan a beam, which is emitted from a light source, onto a predetermined one-dimensional (linear) or two-dimensional (planar) region and displays information, such as an image, or read data, such as locations or an image. Furthermore, the scanning micro mirror according to the present invention can be applied to optical switching devices that require the static directional modulation of reflected light, in addition to the scanning devices.

Recently, with the development of optical device technology, various technologies that use light for stages for inputting and outputting various information and as a medium of information transfer are being developed. A method of scanning and utilizing a beam emitted from a light source is also one of the technologies, and typical examples of the method include a barcode scanner and a basic level of a scanning laser display. Such beam scanning technology demands a variety of scanning speeds and ranges depending on applications, and a method of using a galvanic mirror or a rotation-type polygon mirror is mainly used in existing beam scanning technology. The galvanic mirror is appropriate for applications that demand scanning speeds of several tens of hertz (Hz), and the polygon mirror can implement scanning speeds of several kilohertz (kHz).

Recently, with the development of various technologies, efforts are continuously made to apply the beam scanning technology to new devices, or to further improve performance in existing applications that adopt the beam scanning technology. A high-resolution projection display system using laser scanning, a head-mount type display, and a laser printer are good examples. The systems, which require high-quality beam scanning, generally demand scanners that are capable of implementing fast scanning speed and large angle displacement. Further, the method of using a conventional polygon mirror is embodied such that a polygon mirror is mounted on a high-speed rotational motor. Accordingly, the method has a limitation in increasing scanning speed, and is disadvantageous in that it is difficult to decrease the overall size of a system and the consumption of power. Furthermore, the noise generated by a motor must be reduced, and it is difficult to reduce costs due to the complicated structure.

Figure 1:
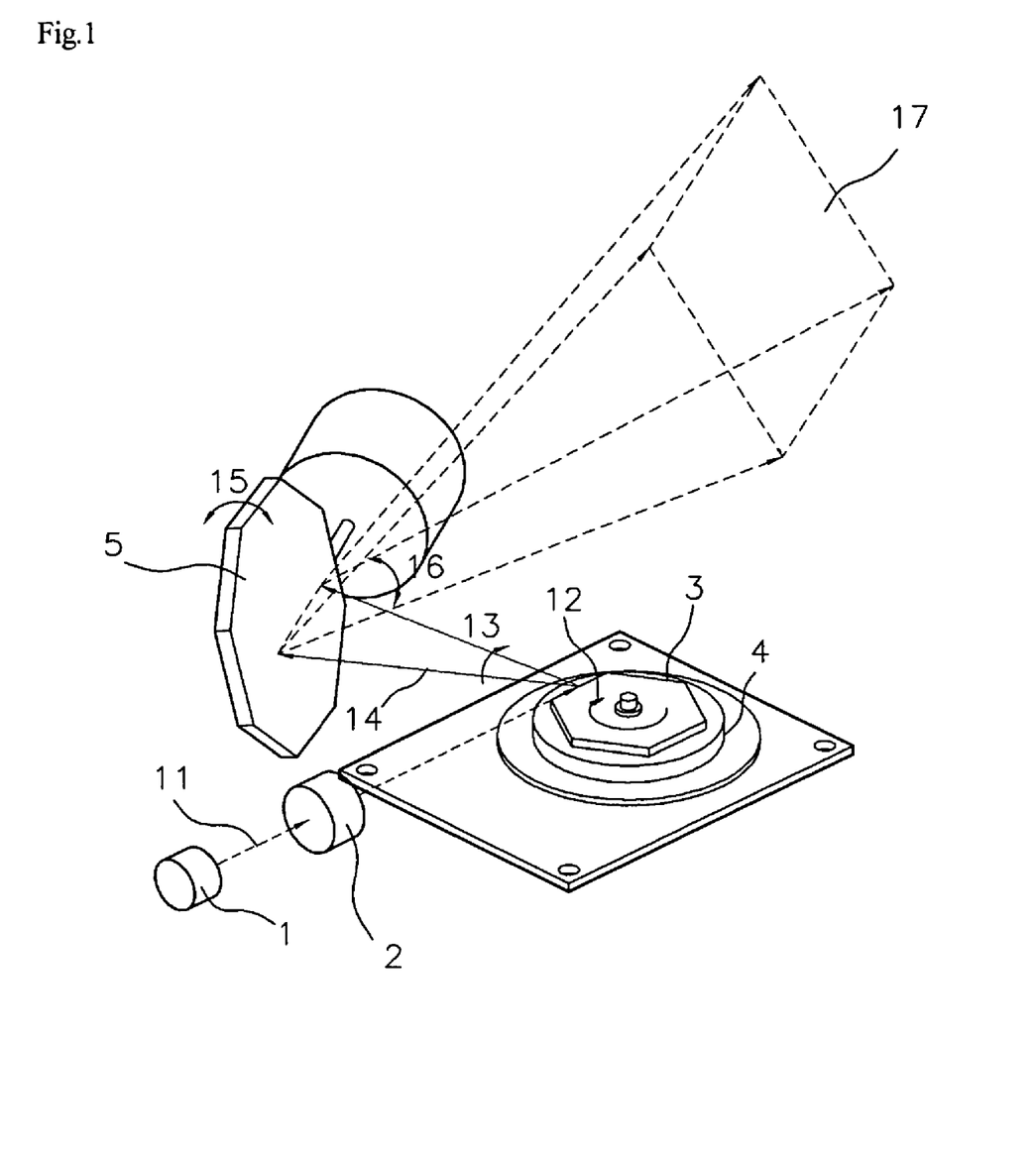
FIG. 1 is a perspective view showing a conventional scanner using a polygon mirror and a galvanic mirror.

FIG. 1 is a perspective view showing a conventional scanner using a polygon mirror and a galvanic mirror.

A conventional scanner includes a light source 1, an optical system 2, a polygon mirror 3, and a motor 4.

Referring to FIG. 1, input light 11, which is emitted from the light source 1, passes through the optical system 2 composed of various lenses, and is reflected by the polygon mirror 3. Accordingly, by rotating the polygon mirror 3 using the motor 4 located below the polygon mirror 3, reflected light 14 can be scanned in a direction identical to the rotational direction 12 of the polygon mirror 3. Although the scanner using the polygon mirror can implement relatively fast scanning, the scanner has limitation in application to high-resolution displays.

SUMMARY OF THE INVENTION

Accordingly, the present invention has been made keeping in mind the above problems occurring in the prior art and an object of the present invention is to provide an optical scanning system.

Another object of the present invention is to provide a method of making the optical scanning system light and compact by integrating a plurality of actuating mirrors.

In order to accomplish the above object, a raster scanning display system of the present invention includes a micro mirror for rotating in two horizontal directions, and forming a horizontal beam by reflecting input light; and a galvanic mirror for rotating in two vertical directions, and forming a two-dimensional scan region by reflecting the horizontal beam.

Another raster scanning display system of the present invention includes a micro mirror for rotating in two horizontal directions, the micro mirror being provided on the inner side of a galvanic mirror rotating in two vertical directions, thus forming a two-dimensional scan region.

A further raster scanning display system includes a micro mirror for rotating in two horizontal directions, and forming a horizontal beam by reflecting input light; and an electromagnetically driven scanning mirror for rotating in two vertical directions, and forming a two-dimensional scan region by reflecting the horizontal beam.

Yet another raster scanning display system includes a micro mirror for rotating in two horizontal directions, the micro mirror being provided on the inner side of an electromagnetically driven scanning mirror rotating in two vertical directions, thus forming a two-dimensional scan region.

In the present invention, the micro mirror is connected by cantilever beams or torsion beams.

In the present invention, the electromagnetically driven scanning mirror includes a coil or magnetic bodies for electromagnetic driving at a predetermined location.

In the present invention, the rotation axes of the mirrors are perpendicular to each other.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Preferred embodiments of the present invention are described in detail with reference to the accompanying drawings below. The same reference numerals are used throughout the different drawings to designate the same or similar components. When it is determined that detailed descriptions of well-known functions or constructions may be unnecessary and make the gist of the present invention unclear, the detailed descriptions will be omitted.

Figure 2:
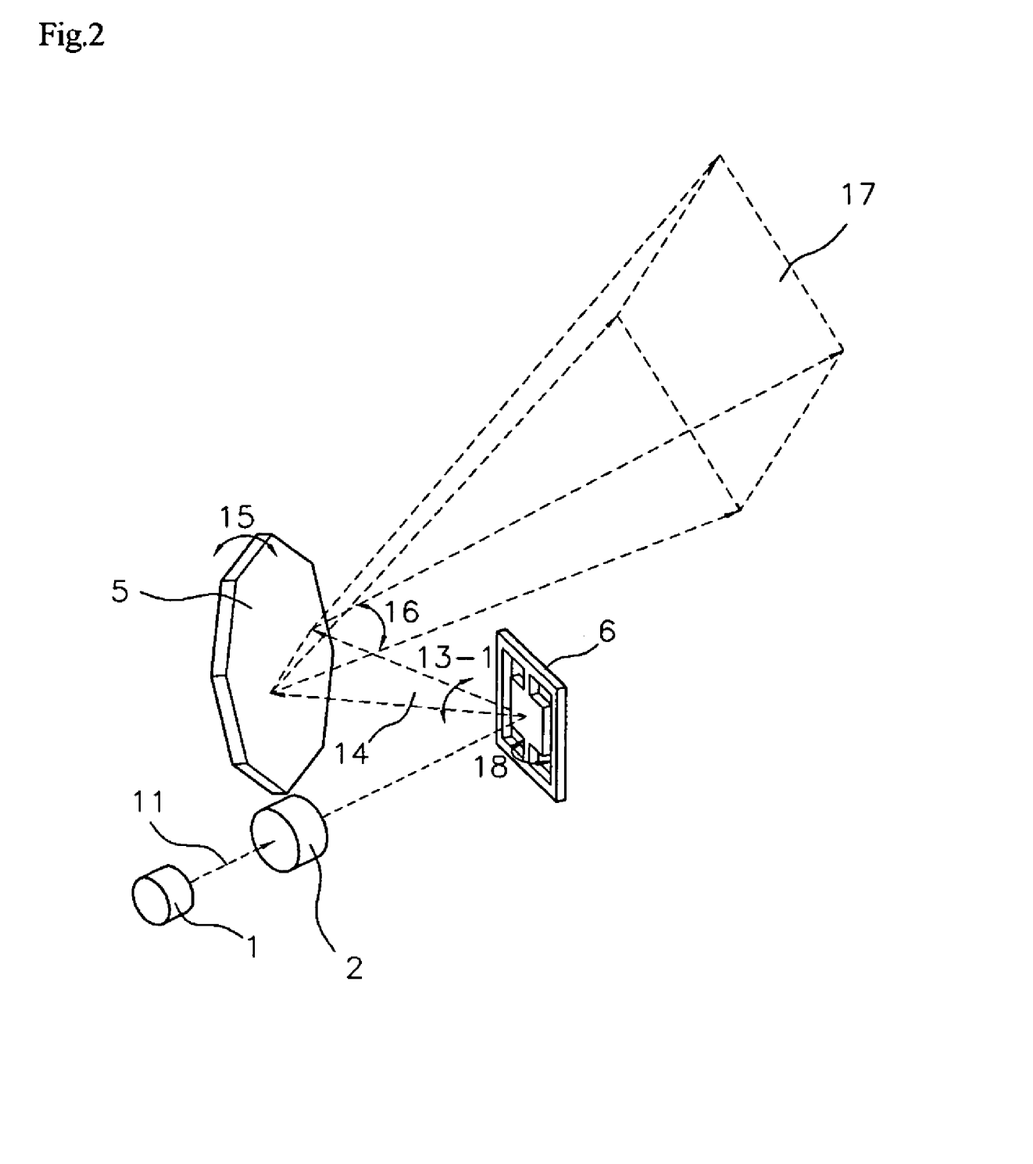
FIG. 2 is a perspective view showing a raster scanning display system using a micro mirror and a galvanic mirror according to an embodiment of the present invention.

FIG. 2 is a view showing the construction of a raster scanning display system according to an embodiment of the present invention.

In the embodiment, the raster scanning display system includes a micro mirror 6 and a galvanic mirror 5.

The embodiment schematically illustrates a method of performing two-dimensional scanning using the micro mirror 6 and the galvanic mirror 5.

Referring to FIG. 2, input light 11, which is emitted from a light source 1, passes through an optical system 2 composed of various lenses, and is incident on the micro mirror 6, that is, a high-speed scanner. The micro mirror 6 shown in FIG. 2 as an example has a structure capable of being rotated in both directions and, thus, reflected light is scanned in two directions 13-1, thereby forming a horizontal beam 14. The linear beam 14, the optical path of which is changed by high-speed scanning, is reflected by the galvanic mirror 5, that is, a low-speed scanner. In this case, the rotational axis of the galvanic mirror 5 is perpendicular to the rotational axis of the micro mirror 6, and an overall scan region 17, which is scanned by the driving of the two mirrors, has a square shape. When a scanning image display system is implemented using the two-axis scanner, the raster scanning display system may further include optical systems, in which optical components, such as lenses and full-reflection mirrors, are combined between the light source 1 and the micro mirror 6, between the high-speed scanner and the low-speed scanner, and between the low-speed scanner and the plane of a screen on which an image is formed.

Figure 3:
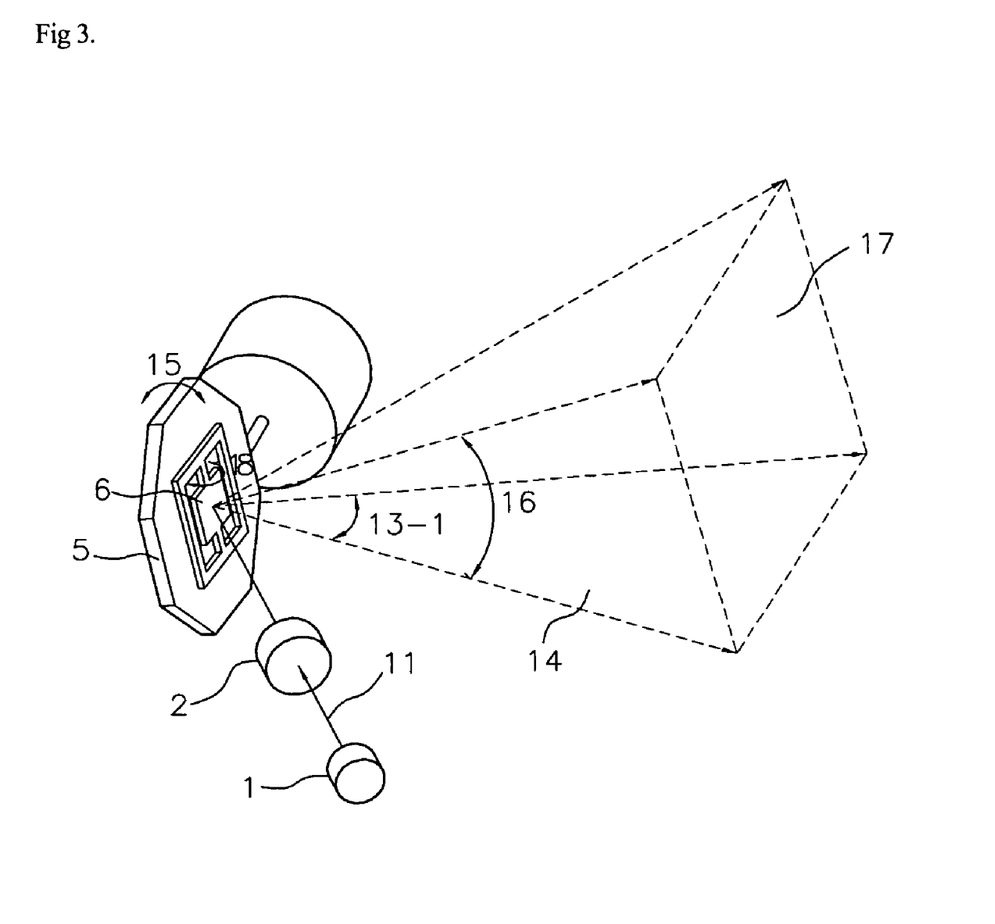
FIG. 3 is a perspective view showing a raster scanning display system in which the micro mirror is mounted on the galvanic mirror according to an embodiment of the present invention.

FIG. 3 is a view showing a raster scanning display system according to an embodiment of the present invention.

In the second embodiment, the raster scanning display system includes a micro mirror 6 and a galvanic mirror 5 that are combined into a single device.

The second embodiment schematically illustrates a method of acquiring a two-dimensional scan region.

Referring to FIG. 3, the micro mirror 6, that is, a high-speed scanner, is mounted on the galvanic mirror 5 so that the rotational axis of the micro mirror 6 is perpendicular to the rotational axis of the galvanic mirror 5. The micro mirror 6 is connected with the galvanic mirror 5 by an elastic, flexible structure. It is preferred that the elastic, flexible structure be implemented using cantilever beams or torsion beams.

The operational principle of the second embodiment is the same as that of FIG. 2. The micro mirror 6 performs rotational motion in two axes in which the rotational direction 18 of the micro mirror 6 is coupled with the rotational direction 15 of the galvanic mirror 5, so that a beam emitted from the light source 1 passes through an optical system 2, is reflected by the micro mirror 6, and, therefore, a two-dimensional region is scanned in a raster manner. Accordingly, the reflection surface of the galvanic mirror 5 does not reflect light.

For example, assuming that a 60 Hz picture is necessary to construct a single picture, the galvanic mirror reciprocates 60 times per second. In contrast, the micro mirror 6 reciprocates at a predetermined velocity according to the number of scanned pixels.

Figure 4:
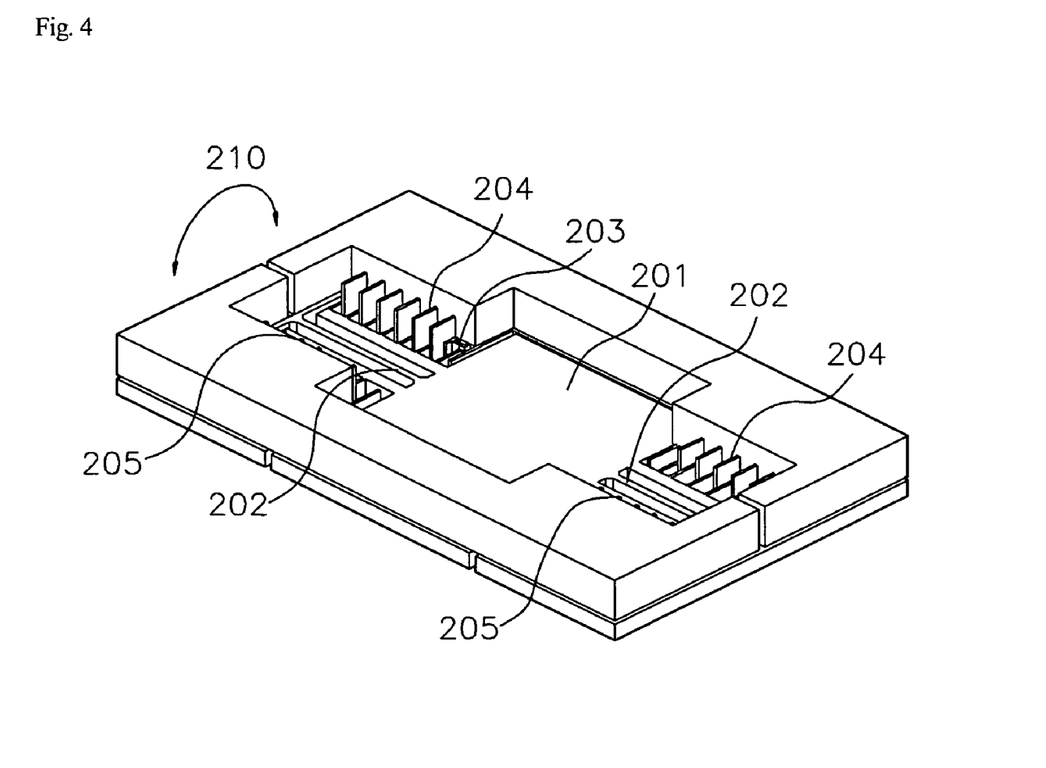
FIG. 4 is a perspective view showing an electrostatically driven scanning mirror according to an embodiment of the present invention.

FIG. 4 is a perspective view showing an example of a micro mirror according to an embodiment of the present invention.

In the embodiment, the micro mirror includes a mirror plate 201, torsion beams 202, movable comb-teeth-shaped electrodes 203, and fixed comb-teeth-shaped electrodes 204 and 205.

The example schematically illustrates a method of rotating the micro mirror using electrostatic force.

Referring to FIG. 4, the micro mirror manufactured using Micro-Electro-Mechanical System (MEMS) technology or a micro-machining functions as a scanner that modulates the light path of reflected light in such a way that the mirror plate 201, on which a reflection surface is formed, performs high-speed rotational motion in predetermined directions 210. The mirror plate 201 is supported by the torsion beams 202 that are formed on both sides of the mirror plate 201 and functions as a rotational axis. A potential difference is alternately applied to the movable comb-teeth-shaped electrodes 203 that are formed beside both ends of the mirror plate 201, and the fixed comb-teeth-shaped electrodes 204 and 205 that are formed on a substrate, so that the mirror plate 201 is driven by electrostatic force. As described above, the reason why the electrodes are formed in a comb-teeth shape is that a large rotational force can be acquired using only a small voltage.

Figure 5A:
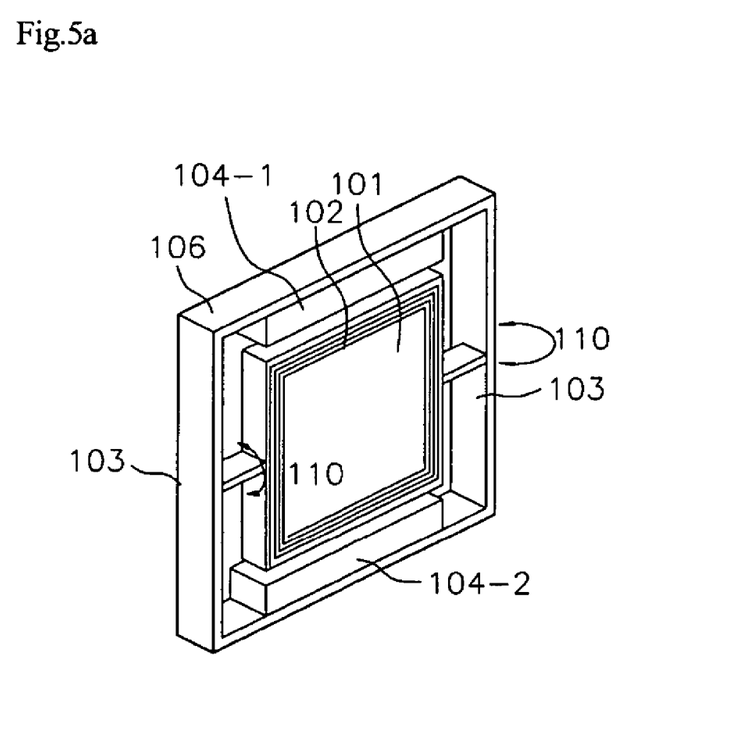
FIGS. 5A and 5B are perspective views showing an electromagnetically driven scanning micro mirror according to an embodiment of the present invention.
Figure 5B:
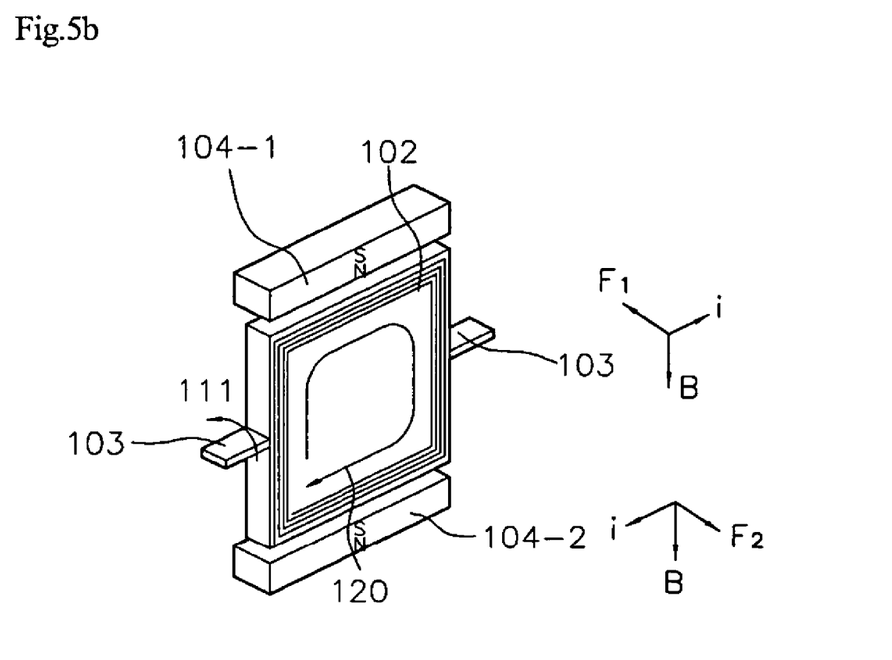

FIGS. 5A and 5B are perspective views showing an electromagnetically driven scanning micro mirror according to an embodiment of the present invention.

In the embodiment, the electromagnetically driven scanning micro mirror includes a mirror plate 101 on which a coil 102 is formed on the outer side of the mirror plate 101, torsion beams 103, permanent magnets 104-1 and 104-2, and a frame 106.

The embodiment schematically illustrates a device that rotates the mirror by controlling the flow of current.

Referring to FIG. 5A, the mirror plate 101 on which the coil 102 is formed or mounted is supported by the torsion beams 103 (or a shaft) and is mounted in the frame 106. The permanent magnets 104-1 and 104-2 are mounted in the frame 106 in a direction perpendicular to the torsion beams 103, and a magnetic field generated by the permanent magnets 104-1 and 104-2 forces the mirror plate 101 to be rotated by Lorenz's force which is an interaction force that depends on the direction and magnitude of current that passes through the coil. The rotation angle of the mirror plate 101 is determined by the equilibrium point between a torque caused by Lorenz's force and the restoring torque of the torsion beams 103 generated by the rotation of the mirror plate 101.

FIG. 5B is a schematic view showing the operational principle of the electromagnetically driven scanning micro mirror.

Referring to FIG. 5B, with respect to an outside magnetic field B, the directions of forces F1 and F2 that act on the mirror plate 101 are opposite to each other because the directions of the current i flowing through the coil 102, which is provided on a predetermined region of the mirror plate 101, are opposite to each other in upper and lower portions, so that the mirror plate 101 is rotated around the rotational axis of the torsion beams 103 in a direction 111 shown in the FIG. 5B. The direction of the current changes at predetermined time intervals and, therefore, the mirror plate 101 can be reciprocated.

The permanent magnets 104-1 and 104-2, which are arranged above and under the frame 106, can be variously disposed such that upper and lower directional magnetic fields can be formed, and it is preferred that the frame 106 be made of a material having high permeability, thus increasing energy efficiency.

Furthermore, permanent magnets or magnetic bodies may be formed in the mirror plate 101, and a coil may be provided at a predetermined location to face the permanent magnets or the magnetic bodies, so that the magnetic fields reciprocatively rotate the mirror plate in the above-describes manner.

Figure 6:
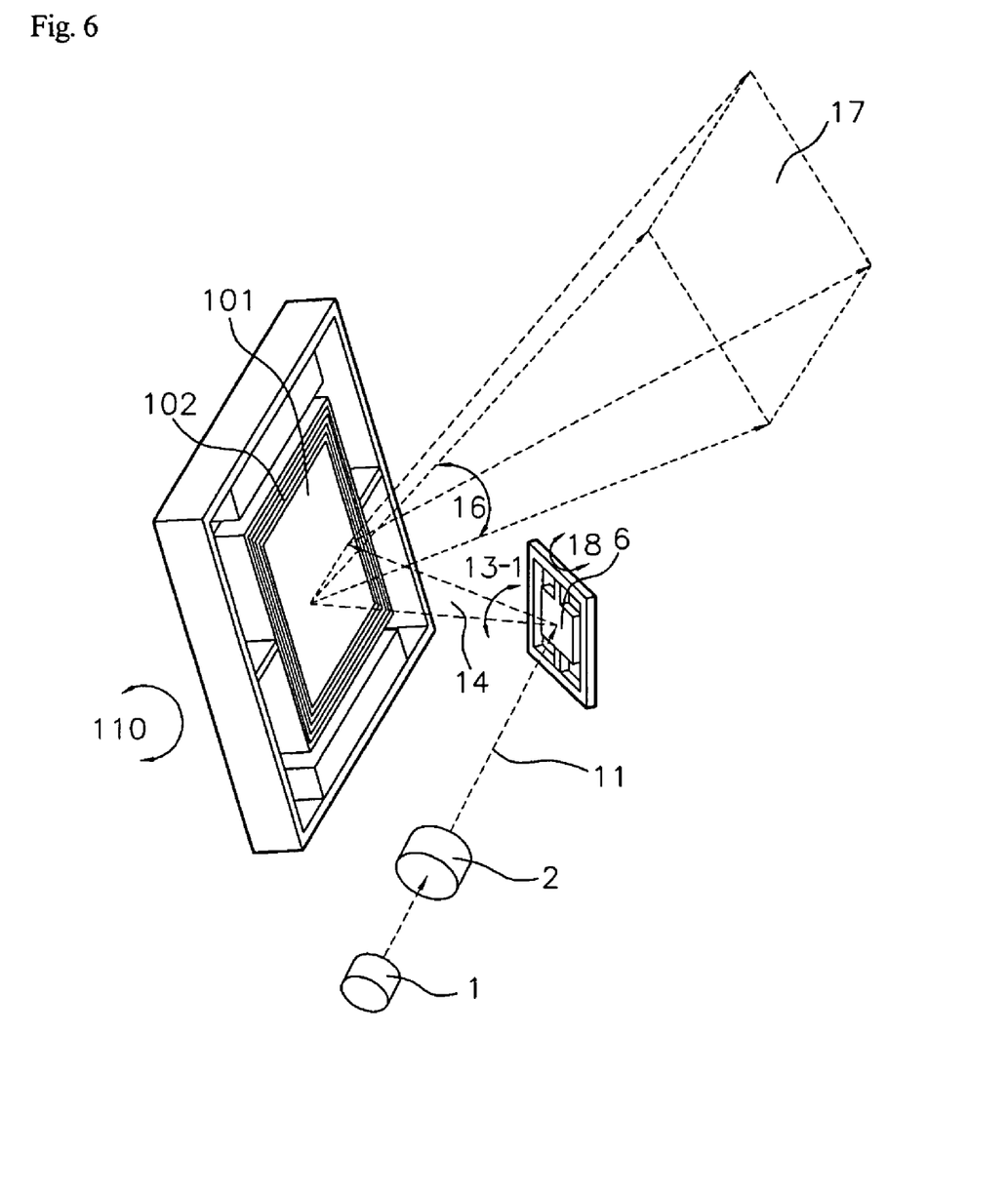
FIG. 6 is a perspective view showing a raster scanning display system using a micro mirror and an electrostatically driven scanning mirror according to an embodiment of the present invention.
Figure 7:
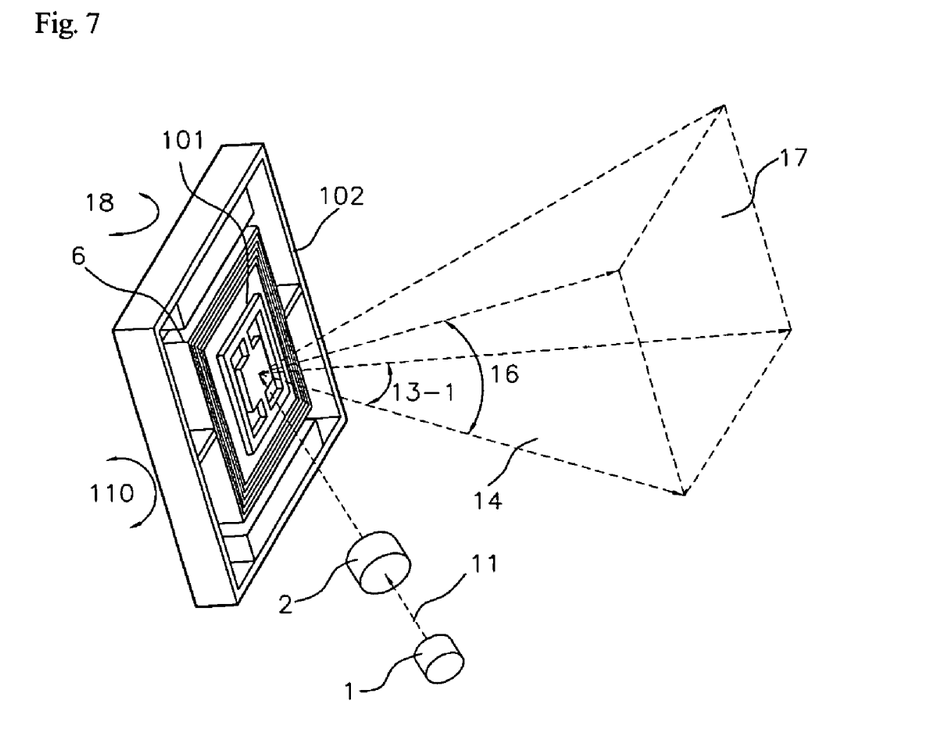
FIG. 7 is a perspective view showing a scanner in which a micro mirror is mounted on an electrostatically driven scanning mirror according to an embodiment of the present invention.

FIGS. 6 and 7 are perspective views of two-axis scanners using an electromagnetically driven scanning mirror as a low-speed scanner. The components, other than the galvanic mirror that is replaced with the electromagnetically driven scanning mirror for a low-speed scanner, are the same as those of the two-axis scanners of FIGS. 2 and 3, and the operational principle of the scanners is also the same as that of FIGS. 2 and 3.

Figure 8A:
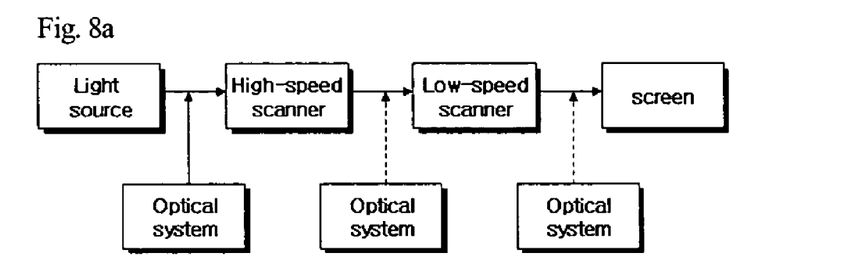
FIGS. 8A and 8B are block diagrams showing raster scanning display systems according to an embodiment of the present invention.
Figure 8B:
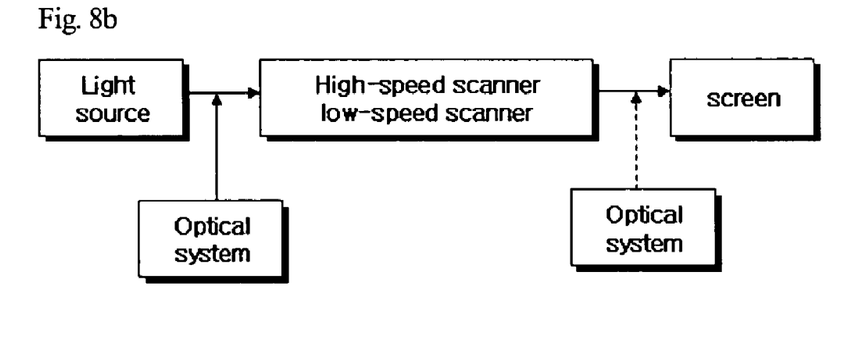

FIGS. 8A and 8B are block diagrams showing raster scanning display systems according to the present invention.

Each of the raster scanning display systems includes a light source, a high-speed scanner, a low-speed scanner, and a screen.

FIG. 8A shows the case where the high-speed scanner and the low-speed scanner are separated form each other.

When light, which is emitted from a light source, passes through an optical system and is then reflected by the high-speed scanner, the reflected light passes through another optical system and is then reflected by the low-speed scanner. The light reflected by the low-speed scanner passes through another predetermined optical system and is then scanned on the screen. Some of the optical systems may be omitted according to applications. The raster scanning display systems described in FIGS. 2 and 6 correspond to the system of FIG. 8A.

FIG. 8B is the case where the high-speed scanner and the low-speed scanner are combined with each other.

Light which is emitted from a light source, passes through an optical system and is then reflected by a device into which the high-speed scanner and a low-speed scanner are combined. Thereafter, the reflected light passes through another optical system and is then scanned on the screen. Some of the optical systems may be omitted according to applications. The raster scanning display systems described in FIGS. 3 and 7 correspond to the system of FIG. 8B.

As described above, the scanning system according to the present invention can be applied to image display devices that scan a beam, which is emitted from a light source, onto a predetermined region and displays information, such as images, or can be applied to information input devices, such as scanners, in which the direction of an optical path is reversed, and data, such as locations or an image, which are reflected from an image plane, are read.

In the case where the scanning system is applied to the image display device, a scanning image display system using a point light source can be implemented, and can be applied to various display systems that are implemented in large screen form using a compact and light system, or has excellent primary color representation using a laser light source, which are difficult to implement using an existing projection system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A scanning display system, comprising:
   a micro mirror unit, which comprises a micro mirror, for forming a linear scan region by reflecting input light while reciprocally rotating in two directions;
   a substrate for supporting the micro mirror while the micro mirror rotates, and connection members for connecting the micro mirror to the substrate; and
   a galvanic mirror unit, which has a rotational axis that is perpendicular to a rotational axis of the micro mirror unit, for forming a two-dimensional scan region by receiving and reflecting the linear scan region while reciprocally rotating in two directions,
   wherein a scanning speed of the micro mirror unit is faster than a scanning speed of the galvanic mirror unit, and
   wherein the micro mirror comprises a mirror plate and movable comb-teeth-shaped electrodes formed beside both ends of the mirror plate, and the substrate comprises fixed comb-teeth-shaped electrodes, such that the micro mirror is reciprocally rotated by electrostatic force that is generated by a potential difference caused by applied voltage.

2. The scanning display system as set forth in claim 1, further comprising:
   optical components which comprises lenses or full-reflection mirrors,
   wherein the optical components are combined between a light source and the micro mirror unit, between the micro mirror unit and the galvanic mirror unit, and between the galvanic mirror unit and a plane of a screen on which an image is formed.

3. The scanning display system as set forth in claim 1, wherein the connection members are cantilever beams, torsion beams, an elastic and flexible structure, or shafts.

4. The scanning display system as set forth in claim 1, wherein the galvanic mirror unit comprises a galvanic mirror in which a coil is formed, a frame that is provided with magnets and supports the galvanic mirror during the reciprocal rotation of the galvanic mirror, and connection members that connect the galvanic mirror to the frame.

5. The scanning display system as set forth in claim 4, wherein the connection members are cantilever beams, torsion beams, an elastic and flexible structure, or shafts.

6. The scanning display system as set forth in claim 4, wherein the magnets are positioned in a direction perpendicular to a direction of the connection members.

7. The scanning display system as set forth in claim 1, wherein the galvanic mirror unit comprises a galvanic mirror in which magnets are formed, a frame that is provided with a coil and supports the galvanic mirror during the reciprocal rotation of the galvanic mirror, and connection members that connect the galvanic mirror to the frame.

8. The scanning display system as set forth in claim 7, wherein the connection members are cantilever beams, torsion beams, an elastic and flexible structure, or shafts.

9. The scanning display system as set forth in claim 7, wherein the magnets are positioned in a direction perpendicular to a direction of the connection members.

10. The scanning display system as set forth in claim 1, wherein the micro mirror unit performs a number of the reciprocal rotations that correspond to a number of frames that are required to form one picture per minute.

11. A scanning display system, comprising:
a galvanic mirror unit configured to reciprocally rotate in two directions;
a micro mirror unit, which comprises a micro mirror and has a rotational axis that is perpendicular to a rotational axis of the galvanic mirror unit, and is positioned inside the galvanic mirror unit and configured to form a two-dimensional scan region by reflecting input light while reciprocally rotating in two directions; and
a substrate for supporting the micro mirror while the micro mirror rotates, and connection members for connecting the micro mirror to the substrate,
wherein a scanning speed of the micro mirror unit is faster than a scanning speed of the galvanic mirror unit, and
wherein the micro mirror comprises a mirror plate and movable comb-teeth-shaped electrodes formed beside both ends of the mirror plate, and the substrate comprises fixed comb-teeth-shaped electrodes, such that the micro mirror is reciprocally rotated by electrostatic force that is generated by a potential difference caused by applied voltage.

12. The scanning display system as set forth in claim 11, further comprising:
optical components which comprise lenses or full-reflection mirrors,
wherein the optical components are combined between a light source and the micro mirror unit positioned inside the galvanic mirror unit and between the micro mirror unit positioned inside the galvanic mirror unit and a plane of a screen on which an image is formed.

13. The scanning display system as set forth in claim 11, wherein the connection members are cantilever beams, torsion beams, an elastic and flexible structure, or shafts.

14. The scanning display system as set forth in claim 11, wherein the galvanic mirror unit comprises a galvanic mirror in which the micro mirror unit is mounted and a coil is formed, a frame that is provided with magnets and supports the galvanic mirror during the reciprocal rotation of the galvanic mirror, and connection members that connect the galvanic mirror to the frame.

15. The scanning display system as set forth in claim 14, wherein the connection members are cantilever beams, torsion beams, an elastic and flexible structure or shafts.

16. The scanning display system as set forth in claim 14, wherein the magnets are placed in a direction perpendicular to a direction of the connection members.

17. The scanning display system as set forth in claim 11, wherein the galvanic mirror unit comprises a galvanic mirror in which the micro mirror unit is mounted and magnets are formed, a frame that is provided with a coil and supports the galvanic mirror during the reciprocal rotation of the galvanic mirror, and connection members that connect the galvanic mirror to the frame.

18. The scanning display system as set forth in claim 17, wherein the connection members are cantilever beams, torsion beams, an elastic and flexible structure or shafts.

19. The scanning display system as set forth in claim 17, wherein the magnets are placed in a direction perpendicular to a direction of the connection members.

20. The scanning display system as set forth in claim 11, wherein the micro mirror unit performs a number of the reciprocal rotations that correspond to a number of frames that are required to form one picture per minute.

* * * * *